US012427550B2

(12) United States Patent
Huang et al.

(10) Patent No.: US 12,427,550 B2
(45) Date of Patent: Sep. 30, 2025

(54) METHODS FOR REMOVING DEPOSITS ON THE SURFACE OF A CHAMBER COMPONENT

(71) Applicant: APPLIED MATERIALS, INC., Santa Clara, CA (US)

(72) Inventors: Tuochuan Huang, Santa Clara, CA (US); Min Shen, Santa Clara, CA (US); Kenneth Chien, Santa Clara, CA (US); Han Wang, Santa Clara, CA (US); Stayce Parmer, Santa Clara, CA (US); Rynn Wang, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/862,998

(22) Filed: Jul. 12, 2022

(65) Prior Publication Data

US 2024/0017299 A1 Jan. 18, 2024

(51) Int. Cl.

*B24B 37/04* (2012.01)
*B08B 1/10* (2024.01)
*B08B 3/02* (2006.01)
*B08B 3/08* (2006.01)
*B08B 7/00* (2006.01)
*B08B 7/04* (2006.01)

(52) U.S. Cl.

CPC .................. *B08B 3/08* (2013.01); *B08B 1/10* (2024.01); *B08B 3/02* (2013.01); *B08B 7/0071* (2013.01); *B08B 7/04* (2013.01); *B24B 37/044* (2013.01)

(58) Field of Classification Search

CPC .. B08B 3/08; B08B 1/001; B08B 3/02; B08B 7/0071; B08B 7/04; B24B 37/044

See application file for complete search history.

(56) References Cited

U.S. PATENT DOCUMENTS 6,376,977 B1 * 4/2002 Kawai ............... H01J 37/32009 313/352
7,250,114 B2 * 7/2007 Kiehlbauch ............. C03C 15/00 216/88

(Continued)

FOREIGN PATENT DOCUMENTS

KR 20070092249 A * 9/2007

OTHER PUBLICATIONS

"Hyprez Diamond Powders, Compounds, & Slurries" (Copyright 2007, Enrigs Corporation USA), p. 4. (Year: 2007).*
KR-20070092249-A, Machine Translation. (Year: 2025).*

*Primary Examiner* — Joshua L Allen
*Assistant Examiner* — Christopher Remavege
(74) *Attorney, Agent, or Firm* — Lowenstein Sandler LLP

(57) ABSTRACT

Described herein is a method for removing deposits off a surface of a chamber component. The method includes receiving a chamber component, and fixing the chamber component in a fixture. A slurry is then applied to a surface of the chamber component, where the slurry has a pH of about 5 to about 9. The surface is then polished using a polish pad and the slurry. The surface roughness of the surface after polishing is within about 10% of the surface roughness before polishing, and wherein deposits on the surface of the chamber component are removed by polishing. An alternative method for removing deposits is also presented, wherein the chamber component is heated to a temperature of about 500° C. to about 1500° C.

11 Claims, 4 Drawing Sheets

(56) References Cited

U.S. PATENT DOCUMENTS

| | | | | |
|---|---|---|---|---|
| 9,358,702 | B2 * | 6/2016 | Banda | H01L 21/67103 |
| 9,669,653 | B2 * | 6/2017 | Parkhe | H01L 21/461 |
| 10,056,284 | B2 * | 8/2018 | Parkhe | B24C 1/06 |
| 10,654,147 | B2 * | 5/2020 | Boyd, Jr. | B24B 37/044 |
| 11,179,965 | B2 * | 11/2021 | Parkhe | B24B 37/26 |
| 2007/0047170 | A1 * | 3/2007 | Sun | H01L 21/6833 361/234 |
| 2007/0051699 | A1 * | 3/2007 | Kiehlbauch | C03C 23/0075 216/67 |
| 2008/0092920 | A1 * | 4/2008 | Shih | B08B 3/12 134/1 |
| 2008/0153396 | A1 * | 6/2008 | Laconto | C09G 1/02 451/41 |
| 2010/0144246 | A1 * | 6/2010 | Avoyan | B08B 3/12 451/60 |
| 2012/0255635 | A1 * | 10/2012 | Banda | B24B 37/107 156/701 |
| 2014/0263176 | A1 * | 9/2014 | Parkhe | H01L 21/3212 216/53 |
| 2015/0044947 | A1 * | 2/2015 | Lu | B24B 37/32 451/41 |
| 2017/0250101 | A1 * | 8/2017 | Parkhe | H01L 21/30625 |
| 2018/0244532 | A1 * | 8/2018 | Killeen | B24B 37/044 |
| 2018/0319205 | A1 * | 11/2018 | Parkhe | H01L 21/6833 |
| 2019/0111541 | A1 * | 4/2019 | Boyd, Jr. | H01L 21/68757 |
| 2019/0153263 | A1 * | 5/2019 | Morinaga | B24B 37/044 |
| 2021/0205858 | A1 * | 7/2021 | Yasseri | B08B 3/12 |
| 2023/0364732 | A1 * | 11/2023 | Hirako | C11D 1/62 |

* cited by examiner

METHODS FOR REMOVING DEPOSITS ON THE SURFACE OF A CHAMBER COMPONENT

TECHNICAL FIELD

Embodiments of the present disclosure relate, in general, to a method for removing deposits on the surface of a chamber component. In one embodiment, the method may include applying a slurry to the surface of the chamber component and polishing the surface of the chamber component using the slurry to remove deposits. In another embodiment, the method may include heat treating a chamber component to remove deposits.

BACKGROUND

Various manufacturing processes expose semiconductor process chamber components to high temperatures, high energy plasma, a mixture of corrosive gases, high stress, and combinations thereof. These extreme conditions may erode and/or corrode the chamber components, and may form deposits on the surface of the chamber components. These deposits may increase the susceptibility of substrates processed in chambers that include the chamber components to defects and/or particle contamination. It may be advantageous to remove the deposits to extend the lifespan of the chamber components.

Therefore, there is a need to have a method to remove any deposits from a surface of the chamber component without damaging the surface of a chamber component.

SUMMARY

In some embodiments of the present disclosure, methods of removing deposits from a surface of a chamber component are provided. In one embodiment, the method may include receiving a chamber component and fixing the chamber component in a fixture. The method may further include applying a slurry to a surface of the chamber component, the slurry having a pH of about 7 to about 9; and polishing the surface of the chamber component using a polish pad and the slurry. From this method, a surface roughness of the surface after polishing may within about 10% of the surface roughness before polishing, and wherein deposits on the surface of the chamber component may be removed by the polishing.

In another embodiment of the present disclosure, a method may include receiving a chamber component including deposits on a surface of the chamber component. The method may further include spraying a surface of the chamber component using water. After spraying the spraying the surface of the chamber component with water, the surface of the chamber component may be wiped using a combination of alcohol and acetone. After wiping the surface, the surface may be rinsed with water for a time period. The surface may then be dried. The method may further include heating the chamber component to a temperature of about 500° C. to about 1500° C., wherein the metal fluoride deposits are removed from the surface of the chamber component as a result of the heating.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
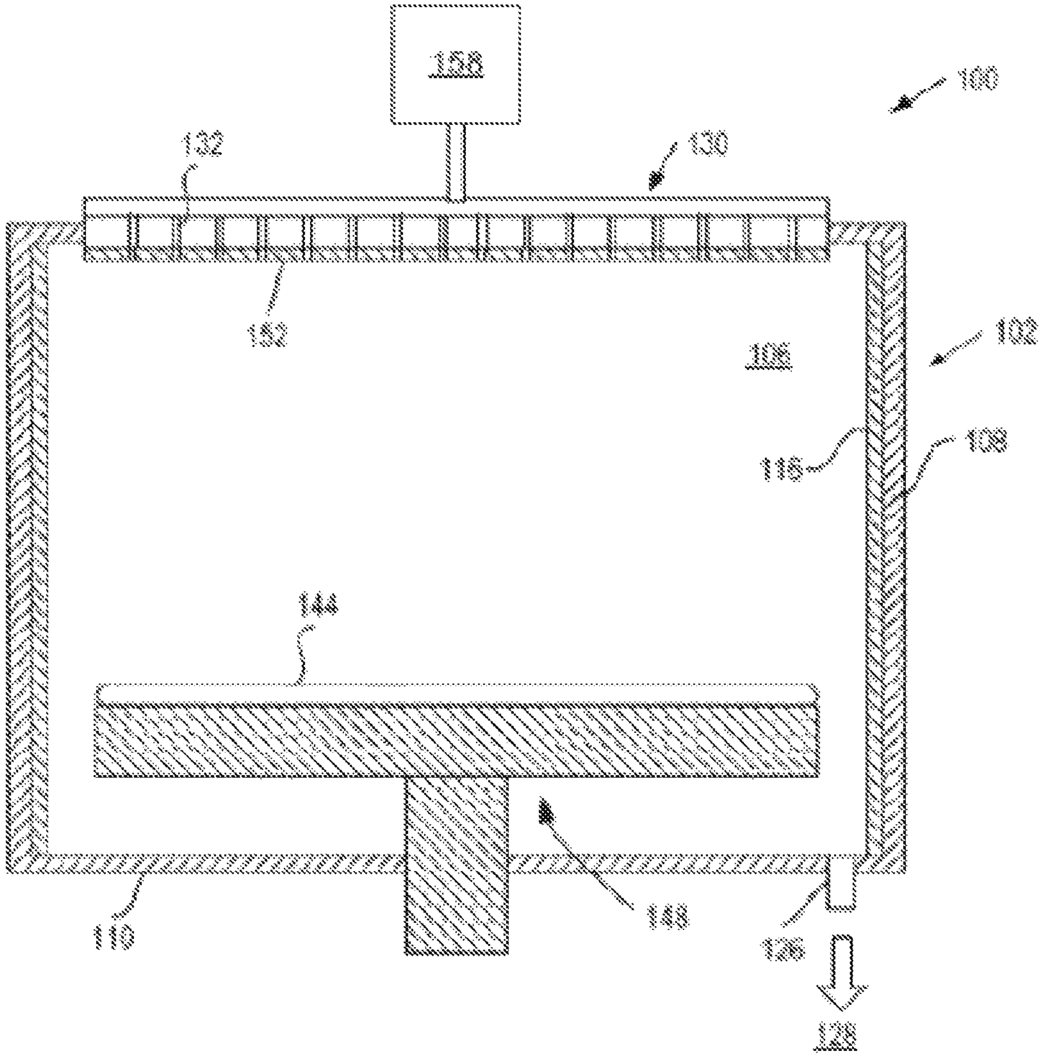
FIG. 1 depicts a cross sectional view of a processing chamber.

Chamber components are used in a variety of ways during the manufacturing process of substrates (e.g., for manufacture of a semiconductor device and/or display). During manufacturing, the chamber component may have numerous deposits form thereon. These deposits may include, but are not limited to, deposits of a metal fluoride. Metal fluoride deposits are difficult to remove from the surface of the chamber component and may accumulate over time. When deposits accumulate over time, the performance of the chamber component is impacted and it should be replaced to mitigate negative impact to yield of manufactured devices. The present disclosure includes methods to remove these deposits, which expands the lifespan of the chamber component.

Embodiments disclosed herein describe methods for removing deposits from a chamber component (e.g., from a used chamber component). In an embodiment, the method may include receiving a chamber component and fixing the chamber component in a fixture. The method may also include applying a slurry to a surface of the chamber component, the slurry having a pH of about 7 to about 9. The method may include polishing the surface of the chamber component using a polish pad and the slurry. In the method, a surface roughness of the surface after polishing is within about 10% of the surface roughness before polishing, and deposits on the surface of the chamber component are removed by the polishing.

When using a slurry, the particle size of the slurry may be varied depending the surface roughness of the surface of the chamber component. In particular, nanoparticles may be used in the slurry. By using small particle sizes or varying the particle size of the slurry, the surface roughness of the surface may be controlled, damage to the coating layer may be prevented. To prepare the slurry, a slurry material including sand or silicon dioxide may be diluted with deionized (DI) water or another solvent. The concentration of the particles may be about 20 wt % to about 50 wt % of the total concentration of the slurry. The surface of the chamber component may be flat or substantially flat.

Alternatively, in another embodiment, a method for removing deposits may include receiving a chamber component including deposits on a surface of the chamber component. These deposits may include, but are not limited to, deposits of a metal fluoride. The method may include spraying a surface of the chamber component using deionized (DI) water. The method may also include after spraying the surface of the chamber component with water, wiping the surface of the chamber component using a combination of alcohol and acetone. The method may further include after wiping the surface, rinsing the surface with water for a time period, then drying the surface of the chamber component. The method may include heating the chamber component to a temperature of about 500° C. to about 1500° C., wherein the deposits are removed from the surface of the chamber component as a result of the heating.

It is very difficult to remove deposits and by-products from the surface of used chamber components without damage to the surface of those chamber components. Some physical and chemical methods that might be used to remove any deposits from the surface of the chamber component, such as using a polish pad, such as Scotch-Brite or Diamond Pad, or $CO_2$ bombardment using dry ice, can damage a surface of the chamber component. For example, these methods of removing deposits have been found to damage the surface of chamber components by, including but not limited to, removing about 1 to about 5 nm off of the surface of the chamber component. In another example, these methods of removing deposits may remove several μ-inches off of the surface of the chamber composition. Because of the strong bombardment forces associated with physical cleaning methods, the smooth surface of chamber components may be damaged through scratching, and the physical cleaning methods also may peel a coating layer off. Some chemical methods include using a wet clean to clean parts by attacking the coating layer of the chamber component. Some of the chemicals used for wet cleans include HF, $HNO_3$ and 1-$HFO_2$. However, wet clean approaches may also damage the surface and/or coating of a chamber component. Accordingly, the referenced deposit removal techniques damage surfaces of chamber components and/or coatings of chamber components, increase the surface roughness of chamber components, and/or peel off the coating on chamber components. Moreover, such approaches generally fail to completely remove the deposits from the chamber components. For example, chemical part clean approaches are generally not able to remove all types of deposits, such as Y-deposits, Al—F deposits, C—O deposits, and so on. Additionally, chemical part clean approaches attack part structures and materials such as those formed of yttrium oxide, aluminum oxide and aluminum nitride. Physical part clean approaches, on the other hand, damage and scratch the surfaces of chamber components.

In contrast to the above chemical and physical part clean approaches, embodiments provide multiple methods for cleaning and refurbishing used chamber components that have deposits and/or by-products thereon that do not damage a surface of a cleaned chamber component. In particular, the clean methods used in embodiments remove deposits (e.g., substantially all or about 90-100%, or about 91%, 92%, 93%, 94%, 95%, 96%, 97%, 98% or 99% of deposits) from a surface of a used chamber component. Additionally, the clean methods used in embodiments do not damage a surface of the chamber components (e.g., a coating on a surface of the chamber component), do not increase a surface roughness of the chamber components, and do not remove a surface layer of the chamber components (or remove a de minimis amount of the surface layer of the chamber components). Moreover, the methods described herein may repair small surface damage caused to the chamber components during processing. Embodiments extend the life time of chamber components and reduce the cost of operating process chambers significantly by reducing part replacement.

In embodiments, a chamber component is received, wherein the chamber component may include deposits. The deposits may be a metal fluoride or an etching fluoride. The metal fluoride may include aluminum fluoride or ytrrium oxy-fluoride.

By using a method of the present disclosure, the surface roughness of the surface of the chamber component may be maintained. That is, the surface roughness may be about the same or within about 1%, about 2%, about 3%, about 4%, about 5%, about 6%, about 7%, about 8%, about 9%, or about 10% of the original surface roughness after treatment with one of the methods of the present disclosure. Additionally, the deposits on the surface of the chamber component may be removed from the surface after treatment with one of the methods of the present disclosure.

Some embodiments are described herein with reference to chamber components and other articles installed in plasma etchers for semiconductor manufacturing. It should be understood that the articles described herein may be other structures that are exposed to plasma. Articles discussed herein may be chamber components for processing chambers such as semiconductor processing chambers. For example, the articles may be chamber components for a plasma etcher, a plasma cleaner, a plasma propulsion system, or other processing chambers. The processing chambers may be used for processes in which a corrosive plasma environment having plasma processing conditions is provided. For example, the processing chamber may be a chamber for a plasma etcher or plasma etch reactor, a plasma cleaner, and so forth. Examples of chamber components include a substrate support assembly, an electrostatic chuck (ESC), a ring (e.g., a process kit ring or single ring), a chamber wall, a base, a gas distribution plate, a showerhead, a nozzle, a lid, a liner, a liner kit, a shield, a plasma screen, a flow equalizer, a cooling base, a chamber viewport, a chamber lid, and so on.

In some embodiments, the chamber components described herein may be a ceramic article that may cause reduced particle contamination when used in a process chamber for plasma rich processes. In some embodiments, the chamber components are or include metal articles, which may include a ceramic coating thereon. It should be understood that the ceramic articles and other articles discussed herein may also provide reduced particle contamination when used in process chambers for other processes such as non-plasma etchers, non-plasma cleaners, chemical vapor deposition (CVD) chambers, physical vapor deposition (PVD) chambers, plasma enhanced chemical vapor deposition (PECVD) chambers, plasma enhanced physical vapor deposition (PEPVD chambers, plasma enhanced atomic layer deposition (PEALD) chambers, and so forth when processed (e.g., cleaned or refurbished) according to embodiments described herein.

Referring now to the figures, FIG. 1 is a sectional view of a processing chamber 100 (e.g., a semiconductor processing chamber) having one or more chamber components in accordance with embodiments of the present disclosure. The processing chamber 100 may be used for processes in which a corrosive plasma environment and/or corrosive chemistry is provided. For example, the processing chamber 100 may be a chamber for a plasma etch reactor (also known as a plasma etcher). Examples of chamber components that may be exposed to plasma in the processing chamber 100 are a substrate support assembly 148, an electrostatic chuck (ESC), a ring (e.g., a process kit ring or single ring), a chamber wall, a base, a showerhead 130, a gas distribution plate, a face plate, a liner, a liner kit, a shield, a plasma screen, a remote plasma source, a flow equalizer, a cooling base, a chamber viewport, a chamber lid, a ceramic insulator, a quartz insulator, a nozzle, process kit rings, and so on. In embodiments, processing chamber 100 is used to perform an etch process on a patterned substrate that includes a plurality of trenches formed thereon.

In one embodiment, the processing chamber 100 includes a chamber body 102 and a showerhead 130 that enclose an interior volume 106. The showerhead 130 may or may not include a gas distribution plate. For example, the showerhead may be a multi-piece showerhead that includes a showerhead base and a showerhead gas distribution plate bonded to the showerhead base. Alternatively, the showerhead 130 may be replaced by a lid and a nozzle in some embodiments, or by multiple pie shaped showerhead compartments and plasma generation units in other embodiments. The chamber body 102 may be fabricated from nickel, copper, cobalt, chromium, molybdenum, aluminum, stainless steel, ruthenium, tungsten, platinum, or other suitable material. The chamber body 102 generally includes sidewalls 108 and a bottom 110. Any of the showerhead 130 (or lid and/or nozzle), sidewalls 108 and/or bottom 110 may include a multi-layer plasma resistant coating, or a single layer plasma resistant coating.

An outer liner 116 may be disposed adjacent the sidewalls 108 to protect the chamber body 102. The outer liner 116 may be a halogen-containing gas resist material such as $Al_2O_3$ or $Y_2O_3$. The outer liner 116 may be coated with the multi-layer plasma resistant ceramic coating in some embodiments.

An exhaust port 126 may be defined in the chamber body 102, and may couple the interior volume 106 to a pump system 128. The pump system 128 may include one or more pumps and throttle valves utilized to evacuate and regulate the pressure of the interior volume 106 of the processing chamber 100.

The showerhead 130 may be supported on the sidewalls 108 of the chamber body 102 and/or on a top portion of the chamber body. The showerhead 130 (or lid) may be opened to allow access to the interior volume 106 of the processing chamber 100, and may provide a seal for the processing chamber 100 while closed. A gas panel 158 may be coupled to the processing chamber 100 to provide process and/or carrier gases to the interior volume 106 through the showerhead 130 or lid and nozzle. Examples of process gas that may be delivered by the gas panel 158 and used to process substrates/samples in the processing chamber 100 include a silicon containing gas, halogen-containing gases, such as $C_2F_6$, $SF_6$, HBr, $NF_3$, $CF_4$, $CHF_3$, $CH_2F_3$, F, $NF_3$, $C_{12}$, $CCl_4$, $BCl_3$ and $SiF_4$, among others, and other gases such as $O_2$ or $N_2O$. Examples of carrier gases (also referred to herein as a diluent) include $N_2$, He, Ar, and other gases inert to process gases (e.g., non-reactive gases). The showerhead 130 includes multiple gas delivery holes 132 throughout the showerhead 130. The showerhead 130 may be or may include aluminum, anodized aluminum, an aluminum alloy (e.g., Al 6061), or an anodized aluminum alloy. In some embodiments, the showerhead includes a gas distribution plate (GDP) bonded to the showerhead. The GDP may be, for example, Si or SiC, or may be a ceramic such as $Y_2O_3$, $Al_2O_3$, $Y_3Al_5O_{12}$ (TAG), and so forth. The GDP may additionally include multiple holes that line up with the holes in the showerhead.

For processing chambers used for conductor etch (etching of conductive materials), a lid may be used rather than a showerhead. The lid may include a center nozzle that fits into a center hole of the lid. The lid may be a ceramic such as $Y_2O_3$, $Al_2O_3$, YAG or a ceramic compound comprising $Y_4Al_2O_9$ and a solid-solution of $Y_2O_3$—$ZrO_2$. The nozzle may also be a ceramic, such as $Y_2O_3$, $Al_2O_3$, YAG or a ceramic compound comprising $Y_4A_2O_9$ and a solid-solution of $Y_2O_3$—$ZrO_2$.

A substrate support assembly 148 is disposed in the interior volume 106 of the processing chamber 100 below the showerhead 130. The substrate support assembly 148 holds a substrate 144 (e.g., a wafer) during processing. The substrate support assembly 148 may include an electrostatic chuck that secures the substrate 144 during processing, a metal cooling plate bonded to the electrostatic chuck, and/or one or more additional components. An inner liner may cover a periphery of the substrate support assembly 148. The inner liner may be a halogen-containing gas resist material such as $Al_2O_3$ or $Y_2O_3$. The substrate support assembly, portions of the substrate support assembly, and/or the inner liner may be coated with the metal layer and barrier layer in some embodiments.

In some embodiments, the article of the present disclosure may be a chamber component, such as a substrate support assembly, an electrostatic chuck (ESC), a ring (e.g. a process kit ring or single ring), a chamber wall, a base, a gas distribution plate or showerhead, a liner, a liner kit, a shield, a plasma screen, a flow equalizer, a cooling base, a chamber viewport, a chamber lid, a face plate, an SMD, and so on. The body of an article may be a metal, a ceramic, a metal-ceramic composite, a polymer or a polymer-ceramic composite. In an embodiment, the body of the article may be an aluminum alloy or stainless steel. In another embodiment, the body of the article may be a ceramic material such as $Al_2O_3$, $Y_2O_3$ AN, $SiO_2$, YAG and so on.

Various chamber components are composed of different materials. For example, an electrostatic chuck may be composed of a ceramic such as $Al_2O_3$ (alumina), AlN (aluminum nitride), TiO (titanium oxide), TiN (titanium nitride) or SiC (silicon carbide) bonded to an anodized aluminum base. In another example, a lid for a plasma etcher used for conductor etch processes may be a sintered ceramic such as $Al_2O_3$ or YAG, which has a high flexural strength and high thermal conductivity. Ceramic materials when exposed to processing gases, such as a fluorine chemistry, may form AlF particles or metal fluoride deposits as well as aluminum metal contamination on processed substrates. In another example, a showerhead for an etcher used to perform dielectric etch processes is typically made of anodized aluminum bonded to a SiC faceplate. When such showerhead is exposed to plasma chemistries, metal fluoride deposits may form on the surface. Some chamber components may include a coating layer, or multiple coating layers. For example, a lid or nozzle may include a multi-layer plasma resistant coating, or a single layer plasma resistant coating, such as a ytrrium oxide, aluminum oxide, yttrium aluminum garnet (YAG), erbium oxide, erbium aluminum garnet (EAG), rare earth oxides, and so on.

When the surfaces of a chamber component are no longer smooth, i.e. have deposits or particles form on the surfaces of the chamber component or the surface of the chamber component has been eroded from a plasma process, the chamber component cannot function at optimal capacity and typically is replaced. However, replacement of parts can be costly, wasteful, and environmentally harmful. Resource consumption and cost of operating process chambers can be reduced if one or more chamber components are refurbished and reused rather than thrown out an replaced after particle buildup reaches a threshold amount. Thus, the methods of cleaning the surface of the present disclosure may be useful in various chamber components to remove the metal fluoride deposits or particles that form on a surface of a chamber component to enable those chamber components to be reused.

An example of a chamber component for use in a method of the present disclosure will be described referencing a showerhead. It is to be understood that the methods of the present disclosure are not limited to a showerhead but can be used with any chamber component. Some methods are particularly suited for chamber components that have one or more flat or substantially flat surfaces.

Figure 2:
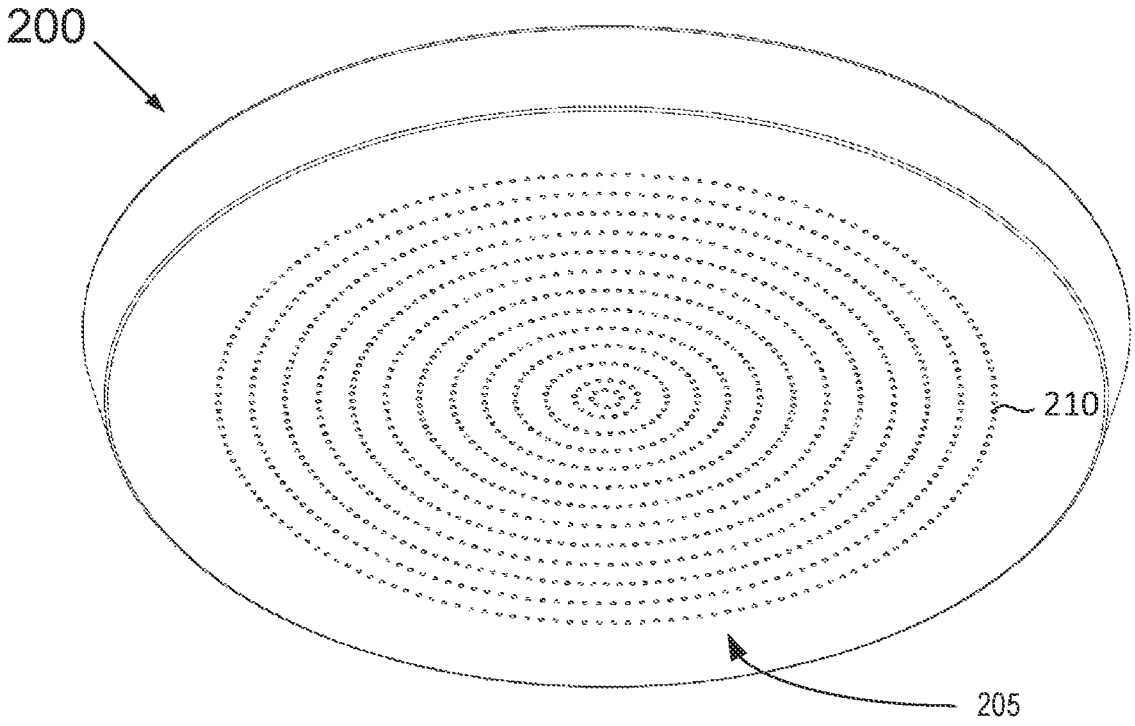
FIG. 2 depicts a bottom view of a showerhead that may have deposits on the surface that are removed using a method of the present disclosure.

FIG. 2 illustrates a bottom view of a showerhead 200. The showerhead example provided below is just an exemplary chamber component that may be cleaned and refurbished by applying methods described herein. It is to be understood that other chamber components may also be cleaned and refurbished by applying the methods herein. The showerhead 200, as depicted here, was chosen as an illustration of a chamber component having a metal surface with complex geometry and holes with large aspect ratios.

The complex geometry of lower surface 205 is configured to receive a corrosion resistant film. Lower surface 205 of showerhead 200 defines gas conduits 210 arranged in evenly distributed concentric rings. In other embodiments, gas conduits 210 may be configured in alternative geometric configurations and may have as many or as few gas conduits as needed depending on the type of reactor and/or process utilized. Lower surface 205 may be a metal surface such as nickel, copper, chromium, cobalt, molybdenum, tungsten, platinum, ruthenium, or stainless steel. Lower surface 205 may also comprise a ceramic material such as $Al_2O_3$, $Y_2O_3$ AlN, $SiO_2$, YAG In an embodiment, metal surface 205 comprises nickel.

A corrosion resistant film (e.g., alumina) may be deposited, using an ALD technique or another deposition technique. The corrosion resistant film may have a uniform thickness in embodiments. Uniform thickness refers to a corrosion resistant film having a thickness variation of less than about +/−20%, a thickness variation of +/−10%, a thickness variation of +/−5%, or a lower thickness variation when comparing the thickness of the corrosion resistant film at one location to its thickness at another location on the film or when assessing the standard deviation achieved from the average of a plurality of thickness values from a plurality of locations on the film.

As discussed above, showerhead 200 may be exposed to corrosive chemistries such as fluorine and may erode due to plasma interaction with the showerhead. A corrosion resistant film deposited on the surface of the showerhead may maintain the relative shape and geometric configuration of the lower surface 205 and of the gas conduits 210 so as to not disturb the functionality of the showerhead. Similarly, when applied to other chamber components, a corrosion resistant film may maintain the shape and geometric configuration of the surface it coats so as to not disturb the component's functionality, provide plasma resistance, and improve corrosion resistance throughout the entire surface.

Showerhead 200 may have deposits form on the surface of the showerhead 200 or on the corrosion resistant film of the showerhead 200. The deposits may be removed from the surface and/or corrosion resistant film of the showerhead 200 using one of the methods described in FIGS. 3 and 4 of the present disclosure.

Figure 3:
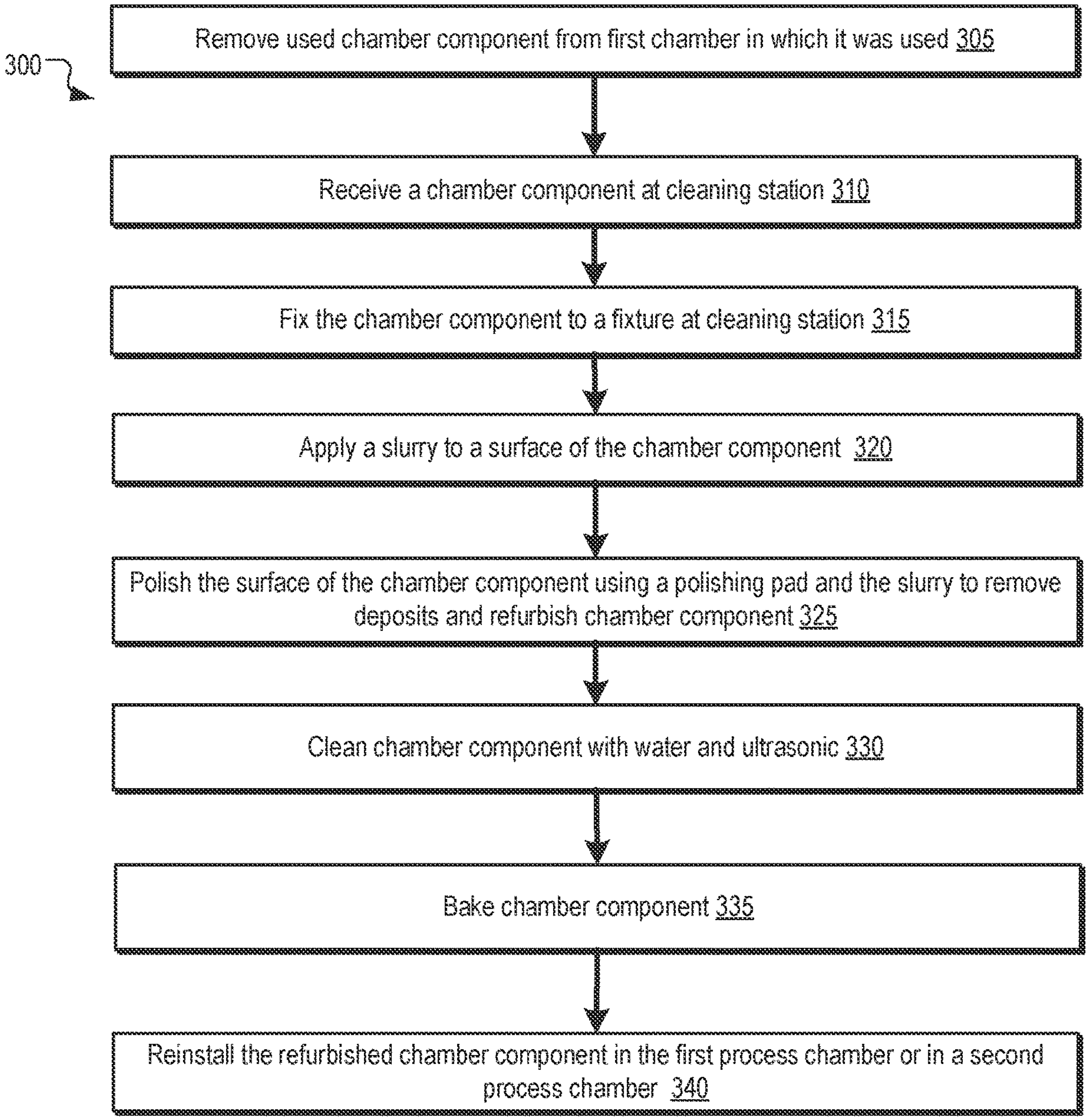
FIG. 3 is a flow chart representing a method for removing deposits from a surface of a chamber component using a slurry.

FIG. 3 is a flow chart representing a method 300 for cleaning of a chamber component according to an embodiment of the present disclosure. In the method 300, at block 305 a used chamber component is removed from a first process chamber in which it was used.

At block 310, the chamber component may be received at a cleaning station. The chamber component may be a chamber lid, a showerhead, a nozzle, a substrate support assembly, an electrostatic chuck, a coupon, a gas distribution plate, or another chamber component. The chamber component may be a used chamber component, and may include deposits formed thereon during use of the chamber component in a process chamber that processed substrates. In some embodiments, the deposits may be or include metal fluoride deposits. The metal fluoride deposits may include, for example, yttrium oxyfluoride and/or aluminum fluoride deposits. Additionally, one more by-products of processes (e.g., etch processes and/or deposition processes) may be on the surface(s) of the chamber component. The metal fluoride deposits on the chamber component may have formed because the chamber component was exposed to plasma chemistries, such as fluoride chemistries, in a processing chamber. In some embodiments, the surface uniformity of the chamber component may be altered prior to being received. The surface uniformity of the chamber component may be altered after being exposed to plasma conditions because of ion bombardment or chemical etch processes.

After receiving the chamber component, the chamber component may be fixed to a fixture at block 315. The fixture may be made from polytetrafluoroethylene (PTFE), poly(p-phenylene oxide (PPO) or poly(p-phenylene ether (PPE) and may include various clamps to fix various chamber components in place. For example, a chamber component may be placed on a flat plate and clamps may be used to fix the chamber component in place from the side of the chamber component. At block 320, a slurry is then applied to a surface of the chamber component. The surface of the chamber component (or at least one surface of the chamber component) may be flat or substantially flat. The slurry may have a pH of about 7 to about 9, or about 7. By using a non-acidic slurry (e.g., a slurry with a pH of about 7 or less), chemical attack of the surface may be reduced or eliminated while still achieving cleaning of the chamber component.

The slurry may include nanoparticles having a particle size of from about 30 nanometers (nm) to about 4000 nanometers (nm), about 30 nm to about 3000 nm, about 30 nm to about 2000 nm, about 30 nm to about 1000 nm, about 30 nm to about 800 nm, about 50 nm to about 750 nm, about 75 nm to about 700 nm, about 100 nm to about 650 nm, about 125 nm to about 600 nm, about 150 nm to about 550 nm, about 175 nm to about 500 nm, about 200 nm to about 450 nm, or about 250 nm to about 400 nm, or any value or subrange in between. The slurry may also have a concentration of about 20 wt % to about 50% of the nanoparticles, or about 25 wt % to about 45 wt %, or about 30 wt % to about 40 wt %. The slurry may be prepared such that the nanoparticles are dissolved in and/or suspended in a solvent. In some embodiments, the solvent may be water. The nanoparticles may have a size selected to achieve a target surface roughness of the chamber component. Similar to the grits of sandpaper, increasing the particle size in the slurry increases the roughness of the chamber component surface achieved after being polished using the slurry.

At block 325, the surface of the chamber component is then polished using a polish pad and the slurry. In one embodiment, the polishing is performed according to a chemical mechanical polishing (CMP) process. The polishing of the surface of the chamber component may remove deposits on the surface, while maintaining or not increasing a surface roughness of the surface. In some embodiments, the polishing may actually decrease the surface roughness of the surface. In some embodiments, the surface roughness of the surface after polishing is within about 10% of the surface roughness before polishing. In some embodiments, the surface roughness of the surface after polishing is within about 9%, about 8%, about 7%, about 6%, about 5%, about 4%, about 3%, about 2%, or about 1% of the surface roughness before polishing. In examples, the surface roughness of the chamber component before polishing may be about 0.5 μin to about 5 μin, which may be classified as smooth. In other examples, the surface roughness of the chamber component before polishing may be about 0.5 μin to about 10 μin. After polishing, the surface roughness may be about 0.45 μin to about 11 μin, about 0.5 μin to about 10 μin, about 1 pin to about 9 μin or about 1.5 μin to about 7.5 μin. In another embodiment, an average surface roughness of a chamber component before polishing may be about 5 μin, about 10 μin, about 20 μin, about 30 μin, about pin, about 50 μin, about 60 μin, about 70 μin, about 80 μin, about 90 μin, about 100 μin, about 110 μin, about 120 μin, about 130 μin, about 140 μin, about 150 μin, about 160 μin, about 170 μin, about 180 μin, about 190 μin, or about 200 μin. In some embodiments, the polishing of the surface of the chamber component may restore the surface uniformity of the chamber component. That is, the surface uniformity of the chamber component may be within about 10% of the surface uniformity before being exposed to plasma conditions. In some embodiments, the surface uniformity of the chamber component is within about 9%, about 8%, about 7%, about 6%, about 5%, about 4%, about 3%, about 2%, or about 1% of the surface uniformity before being exposed to plasma conditions.

In some embodiments, the polishing may be performed using a chemical mechanical polishing (CMP) process or mechanical polishing or other suitable methods. In one embodiment, the polishing may be performed using a CMP process. In some embodiments, the surface of the chamber component may be flat or substantially flat. The polishing pad may be rotated during polishing of the chamber component. The polishing pad may be flat in some embodiments, enabling the polishing pad to clean flat surfaces. In other embodiments, the polishing pad may have a concave surface with a curvature that approximately matches or matches a curvature of a convex surface of a chamber component being polished.

In some embodiments, the polishing may occur for about 2 hours to about 10 hours, about 3 hours to about 6 hours, or about 6 hours to about 10 hours, or any value or sub range therein.

At block 330, the chamber component is removed from the fixture and cleaned using water and an ultrasonic bath. The chamber component may be placed in the ultrasonic bath for a time period. The ultrasonic bath may include deionized water. The time period may be about 30 minutes to about 2 hours, about 40 minutes to about 1.75 hours, about 50 minutes to about 1.5 hours, or about 1 hour to about 1.25 hours. The water and ultrasonic bath may remove any loosened particles from the surface of the chamber component. At block 335, the chamber component is then baked by heating the chamber component to an elevated temperature. The chamber component is baked in a chamber under vacuum at a temperature from about 90° C. to about 120° C. for about 1 hour to about 3 hours. In some embodiments, after baking, the refurbished chamber component may be removed from the cleaning station, and packaged for shipping to a customer.

In some embodiments, at block 340, the refurbished chamber component is removed from the cleaning station and reinstalled in the first process chamber or in a second process chamber.

Figure 4:
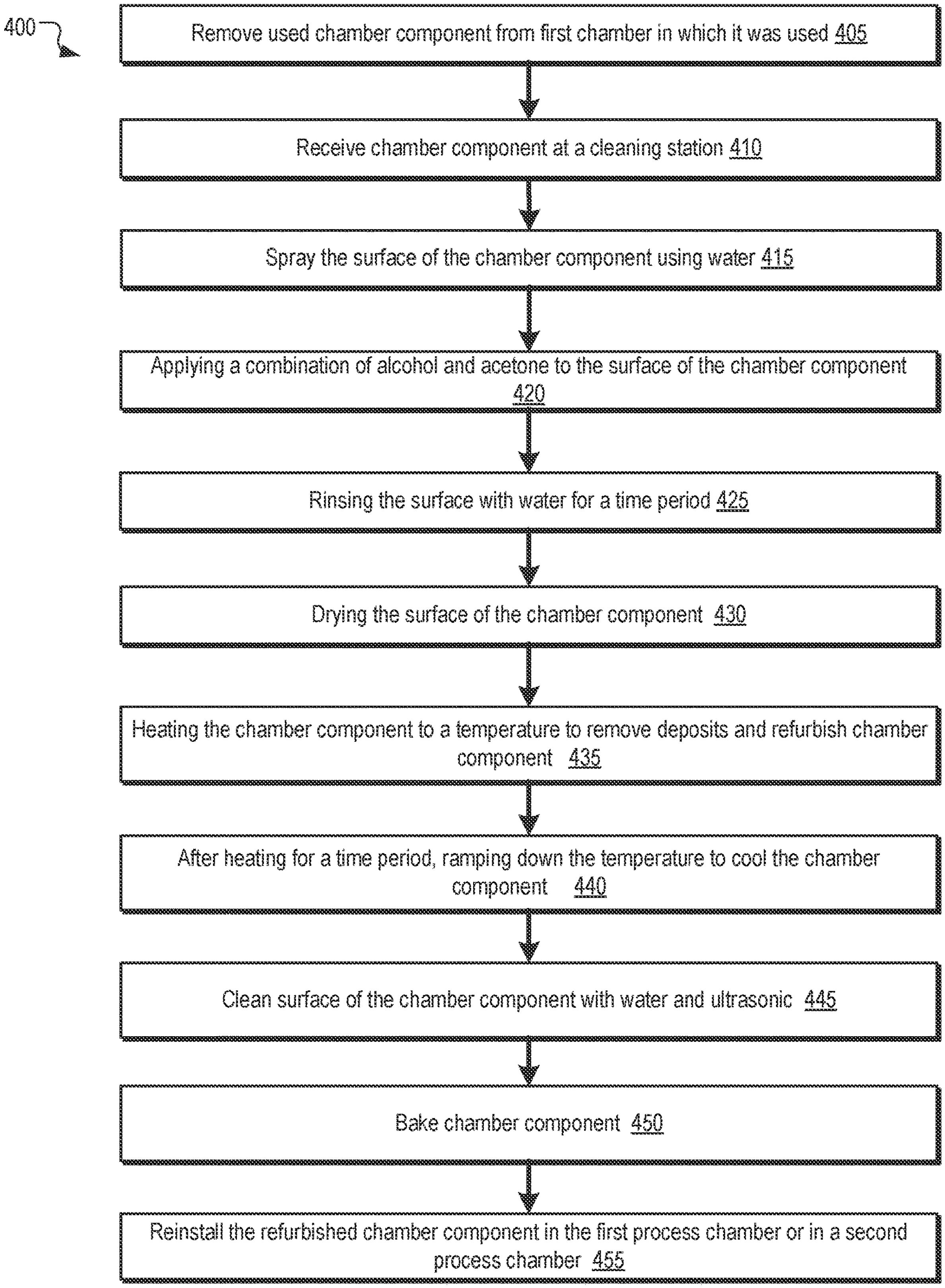
FIG. 4 is a flow chart representing a method for removing deposits from a surface of a chamber component using a heat treatment.

In another embodiment, FIG. 4 is a flow chart representing another method 400 for cleaning the surface of a chamber of component. At block 405 a used chamber component is removed from a first process chamber in which it was used.

At block 410, the chamber component may be received at a cleaning station. The chamber component including deposits on a surface of the chamber component is received. The chamber component may be a substrate support assembly, a ring (e.g. a process kit ring or single ring), a chamber wall, a base, a gas distribution plate or showerhead, a liner, a liner kit, a shield, a plasma screen, a flow equalizer, a cooling base, a chamber viewport, a chamber lid, a face plate, an SMD, or another chamber component. The chamber component may be a used chamber component and may include deposits formed thereon during use of the chamber component in a process chamber that processed substrates. The chamber component may be a metal, a ceramic, or a metal-ceramic composite. In an embodiment, the chamber component may be an aluminum alloy or stainless steel. In another embodiment, the chamber component may be a ceramic material such as $Al_2O_3$, $Y_2O_3$ AlN, $SiO_2$, or YAG. In some embodiments, the deposits on a surface may be or include metal fluoride deposits. The metal fluoride deposits may include, for example, yttrium oxyfluoride and/or aluminum fluoride deposits. Additionally, one or more by-products of processes (e.g., etch processes and/or deposition processes) may be on the surface(s) of the chamber component. In some embodiments, the deposits on the chamber component may have formed because the chamber component was exposed to plasma chemistries, such as fluoride chemistries, in a processing chamber. In other embodiments, the deposits may include impurities and other by-products of plasma conditions.

After receiving the chamber component, at block 415, the surface of the chamber component is sprayed using water. The surface may be sprayed for a time period of about 1 minute to about 15 minutes, about 2 minutes to about 12 minutes, about 3 minutes to about 10 minutes, or about 5 minutes to about 8 minutes. Spraying the surface of the chamber component may remove any loose particle. After spraying, acetone and alcohol are applied to the surface of the chamber component in block 420. The applying may be achieved by wiping the surface or soaking the chamber component in a bath for a time period. In some embodiments, after spraying, alcohol is first applied to the surface of the chamber component followed by acetone. In some embodiments, the time period for soaking may be about 10 minutes to about 120 minutes, about minutes to about 100 minutes, 20 minutes to about 40 minutes, about 30 minutes to about 90 minutes, about 30 minutes to about 60 minutes, or about 30 minutes to about 45 minutes. The alcohol may be isopropyl alcohol (IPA) or ethanol. In some embodiments, the alcohol may be IPA. By applying acetone and alcohol to the surface of the chamber component, any organic contamination may be removed. The chamber component is then rinsed with water for a time period in block 425. The rinsing may be achieved by soaking the chamber component in a bath or by spraying the surface with water. The time period may be about 1 minute to about 15 minutes, about 2 minutes to about 12 minutes, about 3 minutes to about 10 minutes, or about 5 minutes to about 18 minutes. After rinsing, the surface of the chamber component is then dried at block 430. Drying may be achieved by using $N_2$ or high pressure air to dry the surface.

Once dry, the chamber component is then heated to a target temperature at block 435. The chamber component may be heated to a target temperature of about 500° C. to about 1500° C. In some embodiments, the target temperature may be about 500° C., about 600° C., about 700° C., about 800° C., about 900° C., about 1000° C., about 1100° C., about 1200° C., about 1300° C., about 1400° C., or about 1500° C. The heating may be achieved by placing the chamber component in a furnace. If the chamber component is composed of a ceramic material, such as YAG, the temperature of the heating should be at most 1500° C. If the temperature is too high, or above 1500° C., the chamber component composed of YAG may break because of the thermal coefficient of the material. Other materials may have different maximum temperatures that should not be exceeded. Further, to avoid any risk of the chamber component breaking, the temperature should be controlled by ramping up and/or ramping down the temperature. In some embodiments, the temperature may be ramped up at a rate of about 15° C. per hour, 25° C. per hour or about 50° C. per hour. After heating, the temperature may be ramped down at a rate of about 15° C. per hour, 25° C. per hour or about 50° C. per hour. In an embodiment, the temperature may be ramped down at a rate of about 25° C. per hour and ramped up at a rate of about 25° C. per hour. Thus, it may take several hours to heat a furnace to the target temperature of from about 500° C. to about 1500° C.

In some embodiments, during the ramping up and ramping down of temperature, the deposits on the surface of the chamber component may be converted to a gas phase. Therefore, a pump may be attached to the furnace to pump out the gas. The pump may pump the gas to exhaust reacted product form the chamber during the method 400. In some embodiments, an inert gas may be flowed into the furnace while the furnace is heated. The inert gas may be Ar or $N_2$.

Once the target temperature is reached, the heating may be performed for about 2 hours to about 8 hours, about 2.5 hours to about 7.5 hours, about 3 hours to about 7 hours, or about 4 hours to about 6 hours. The heating time may be varied depending on how many deposits are on the surface of the chamber component. In one embodiment, the heating may be performed for about 2 hours. After the heating, the temperature may be ramped down at a rate of about 15° C. per hour, 25° C. per hour or about 50° C. per hour at block 440 to ensure cooling of the chamber component. The temperature may be ramped down to ambient temperature, for example about Additionally, by ramping down of the temperature, this also avoids any risk of the chamber component breaking or cracking. During the method 400 of FIG. 4, the surface roughness or morphology of the surface of the chamber component remains the same before and after treatment. That is, after heating of the chamber component, the surface roughness may be maintained or not increase.

At block 445, the chamber component is placed in an ultrasonic bath including water. The chamber component may be cleaned in the ultrasonic bath for a time period. The ultrasonic bath may include deionized water. The time period may be about 30 minutes to about 2 hour, about 40 minutes to about 1.75 hours, about 50 minutes to about 1.5 hours, or about 1 hour to about 1.25 hours. The water and ultrasonic bath may remove any loosened particles from the surface of the chamber component. At block 450, the chamber component is then baked at an elevated temperature. The chamber component may be baked in a chamber under vacuum at a temperature from about 90° C. to about 120° C. for about 1 hour to about 3 hours.

At block 455, the refurbished chamber component is removed from the cleaning station and may be reinstalled in the first process chamber or in a second process chamber. In some embodiments, after baking, the refurbished chamber component may be removed from the cleaning station, and packaged for shipping to a customer.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:

receiving a chamber component;

fixing the chamber component in a fixture;

applying a slurry to a surface of the chamber component, the slurry having a pH of about 7 to about 9, wherein the slurry comprises nanoparticles having a particle size of from about 30 nanometers to about 400 nanometers; and cleaning the surface of the chamber component using a polish pad and the slurry without reducing a thickness of the chamber component, wherein a surface roughness of the surface after cleaning is within about 10% of the surface roughness before cleaning, and wherein deposits on the surface of the chamber component are removed by the cleaning.

2. The method of claim 1, wherein the chamber component comprises a metal fluoride deposit on the chamber component prior to the cleaning, and wherein the metal fluoride deposit is removed by the cleaning.

3. The method of claim 2, wherein the metal fluoride deposit comprises a yttrium oxy-fluoride deposit.

4. The method of claim 1, wherein the slurry has a concentration of about 20 wt % to about 50 wt % of the nanoparticles.

5. The method of claim 1, wherein the nanoparticles are suspended in a solvent.

6. The method of claim 5, wherein the solvent is water.

7. The method of claim 1, wherein the cleaning is performed using a chemical mechanical polishing (CMP) process.

8. The method of claim 1, wherein the chamber component is selected from a group consisting of a chamber lid, a shower head, a nozzle, a substrate support assembly, an electrostatic chuck, a coupon and a gas distribution plate.

9. The method of claim 1, wherein the slurry has a pH of about 7.

10. The method of claim 1, wherein the surface is substantially flat.

11. The method of claim 1, wherein the cleaning occurs for about 3 hours to about 10 hours.

* * * * *